US011511572B2

(12) United States Patent
Fujii (10) Patent No.: US 11,511,572 B2
(45) Date of Patent: Nov. 29, 2022

(54) TIRE CONDITION MONITORING SYSTEM, TRANSMITTER, AND RECEIVER (71) Applicant: PACIFIC INDUSTRIAL CO., LTD., Gifu-ken (JP)

(72) Inventor: Keiyu Fujii, Gifu-ken (JP)

(73) Assignee: PACIFIC INDUSTRIAL CO., LTD., Gifu-ken (JP)

( * ) Notice: Subject to any disclaimer, the term of this patent is extended or adjusted under 35 U.S.C. 154(b) by 264 days.

(21) Appl. No.: 16/604,018

(22) PCT Filed: Oct. 1, 2018

(86) PCT No.: PCT/JP2018/036755
§ 371 (c)(1),
(2) Date: Oct. 9, 2019

(87) PCT Pub. No.: WO2020/070781
PCT Pub. Date: Apr. 9, 2020

(65) Prior Publication Data
US 2021/0331534 A1    Oct. 28, 2021

(51) Int. Cl.
*B60C 23/04*    (2006.01)
(52) U.S. Cl.
CPC ...... *B60C 23/0489* (2013.01); *B60C 23/0416* (2013.01)
(58) Field of Classification Search
None
See application file for complete search history.

(56) References Cited

U.S. PATENT DOCUMENTS

| 5,335,540 | A  | * | 8/1994 | Bowler | ............... B60C 23/0401 |
| | | | | | 340/447 |
| 2002/0014115 | A1 | * | 2/2002 | Young | ................. B60C 23/0416 |
| | | | | | 73/146 |
| 2003/0187563 | A1 | * | 10/2003 | Fonzes | ................ B60C 23/0416 |
| | | | | | 701/70 |
| 2012/0112899 | A1 | | 5/2012 | Hannon | |
| 2014/0207329 | A1 | | 7/2014 | Juzswik | |
| 2015/0377740 | A1 | * | 12/2015 | Park | ..................... G01M 17/02 |
| | | | | | 702/33 |
| 2016/0297263 | A1 | * | 10/2016 | Watanabe | ........... B60C 23/0488 |
| 2017/0164072 | A1 | * | 6/2017 | Tsujita | .................... B60C 23/04 |

FOREIGN PATENT DOCUMENTS

JP    2012111481 A    6/2012
JP    2014141247 A    7/2012

* cited by examiner

*Primary Examiner* — Matthew G Marini
(74) *Attorney, Agent, or Firm* — Cantor Colburn LLP (57) ABSTRACT

A transmitter includes a power source of the transmitter, a condition detecting section that detects a condition of a tire, a data generating section that generates transmission data that contains tire condition data indicating the condition of the tire detected by the condition detecting section, a transmitting section that modulates the transmission data and transmits the modulated data, a storage section storing a correspondence relationship in which values of a specific bit among bits of the transmission data that change as the wheel assembly rotates are respectively assigned to specific angles set for the rotation angle of the wheel assembly, and a transmission control section that transmits the transmission data from the transmitting section when detecting that the rotation angle of the wheel assembly is any of the specific angles.

3 Claims, 5 Drawing Sheets

| Least Significant Bit | Specific Angle |
|---|---|
| 0 | First Angle |
| 1 | Second Angle |

TIRE CONDITION MONITORING SYSTEM, TRANSMITTER, AND RECEIVER

TECHNICAL FIELD

The present invention relates to a tire condition monitoring system, a transmitter, and a receiver.

BACKGROUND ART

A tire condition monitoring system is known as a system that allows a driver to check the condition of the tires of a vehicle from the passenger compartment. A tire condition monitoring system includes transmitters, which are respectively attached to wheel assemblies, and a receiver mounted on the vehicle. Each transmitter transmits transmission data including condition data indicating the condition of the tire to the receiver. The receiver receives the transmission data to acquire the condition of the tire.

The receiver performs position identification for identifying the wheel assembly to which the transmitter that has transmitted the received transmission data is attached. When performing position identification, the transmitter transmits the transmission data when the rotation angle of the wheel assembly is a predetermined specific angle. Upon reception of the transmission data, the receiver acquires the rotation angle of each wheel assembly from a rotation angle detecting device, which detects rotation angles of multiple wheel assemblies. The receiver obtains the rotation angles of the respective wheel assemblies each time it receives transmission data. The receiver identifies the wheel assembly to which each of the transmitters is attached based on variation of the rotation angles of the wheel assemblies.

Some vehicles have a null point, at which signals of transmission data transmitted from the transmitters interfere with each other. When the specific angle at which the transmission data is transmitted coincides with the null point, the receiver cannot receive the transmission data transmitted at the specific angle. Thus, each transmitter in Patent Document 1 transmits transmission data at multiple specific angles when the position identification is performed.

PRIOR ART DOCUMENT

Patent Document

Patent Document 1: US Patent Application Publication No. 2012/0112899

SUMMARY OF THE INVENTION

Problems that the Invention is to Solve

When transmission data is transmitted at multiple specific angles, the receiver needs to determine at which of the specific angles each transmission of the transmission data has been made. However, if the transmission data is transmitted with data indicating angle information, the data length of the transmission data becomes long, which increases the electric power consumption.

It is an objective of the present invention to provide a tire condition monitoring system, a transmitter, and a receiver that are capable of reducing power consumption by transmission of transmission data.

Means for Solving the Problems

To achieve the foregoing objective and in accordance with a first aspect of the present invention, a tire condition monitoring system is provided that includes transmitters each of which is attached to one of a plurality of wheel assemblies of a vehicle and a receiver mounted on the vehicle. The vehicle includes rotation angle detecting sections that detect rotation angles of the respective wheel assemblies. Each transmitter includes a power source of the transmitter, a condition detecting section, a data generating section, a transmitting section, a storage section, and a transmission control section. The condition detecting section is configured to detect a condition of a tire. The data generating section is configured to generate transmission data that contains tire condition data indicating the condition of the tire detected by the condition detecting section. The transmitting section is configured to modulate the transmission data, which is generated by the data generating section, and transmit the modulated data. The storage section stores a correspondence relationship in which values of a specific bit among bits of the transmission data that change as the wheel assembly rotates are respectively assigned to specific angles set for a rotation angle of the wheel assembly. The transmission control section is capable of performing specific angle transmission in which the transmission control section transmits the transmission data from the transmitting section when detecting that the rotation angle of the wheel assembly is any of the specific angles. The transmission control section is configured to transmit the transmission data at the specific angles that correspond to the specific bit of the transmission data. The receiver includes a receiving section, an identifying section, and a reception storage section. The receiving section is configured to be capable of receiving the transmission data from the transmitters. Upon reception of the transmission data transmitted at the specific angle, the identifying section identifies one of the wheel assemblies to which the transmitter is attached based on a detection value obtained from the rotation angle detecting section. The reception storage section stores the correspondence relationship. The receiving section receives the transmission data from the transmitter that transmits the transmission data at the specific angle corresponding to the correspondence relationship. The identifying section is configured to acquire the specific angle at which the transmission data has been transmitted based on the correspondence relationship and the specific bit of the transmission data received by the receiving section, and identify one of the wheel assemblies to which the transmitter is attached based on the specific angle.

The storage section stores the correspondence relationship in which the specific angles are assigned to the values of the specific bit of the transmission data. The transmission control section transmits the transmission data at the specific angles that correspond to the specific bit of the transmission data. The transmitter transmits the transmission data at the specific angles in correspondence with the value of the specific bit. The reception storage section stores the same correspondence relationship as that stored in the storage section. The identifying section acquires the specific angles at which the transmission data has been transmitted based on the specific bit. Based on the specific angles, the identifying section is able to identify the wheel assembly to which the transmitter is attached. Thus, the receiver is able to acquire the specific angles at which the transmission data has been transmitted without containing data indicating the angle information in the transmission data. This shortens the data length of the transmission data as compared with a case in which the transmission data contains angle information. This reduces the consumption of power of the power source by transmission of the transmission data.

To achieve the foregoing objective and in accordance with a second aspect of the present invention, a transmitter attached to each of a plurality of wheel assemblies of a vehicle is provided. The vehicle includes rotation angle detecting sections that detect rotation angles of the respective wheel assemblies. The transmitter includes a power source of the transmitter, a condition detecting section, a data generating section, a transmitting section, a storage section, and a transmission control section. The condition detecting section is configured to detect a condition of a tire. The data generating section is configured to generate transmission data that contains tire condition data indicating the condition of the tire detected by the condition detecting section. The transmitting section is configured to modulate the transmission data, which is generated by the data generating section, and transmit the modulated data. The storage section stores a correspondence relationship in which values of a specific bit among bits of the transmission data that change as the wheel assembly rotates are respectively assigned to specific angles set for a rotation angle of the wheel assembly. The transmission control section is capable of performing specific angle transmission in which the transmission control section transmits, to a receiver, the transmission data from the transmitting section when detecting that the rotation angle of the wheel assembly is any of the specific angles. The receiver includes a reception storage section that stores the correspondence relationship, and an identifying section that, upon reception of the transmission data, identifies a position of the wheel assembly to which the transmitter is attached based on a detection value obtained from the rotation angle detecting section. The transmission control section is configured to transmit the transmission data when detecting that the rotation angle of the wheel assembly is the specific angle that corresponds to the specific bit of the transmission data.

The transmission control section transmits the transmission data at the specific angles that correspond to the values of the specific bit. The reception storage section stores the correspondence relationship between the values of the specific bit and the specific angles. The reception storage section is thus able to allow the identifying section to acquire the specific angles at which the transmission data has been transmitted. In this case, the receiver is able to acquire the specific angles at which the transmission data has been transmitted without containing data indicating the angle information in the transmission data. This shortens the data length of the transmission data as compared with a case in which the transmission data contains angle information. This reduces the consumption of power of the power source by transmission of the transmission data.

In the above-described transmitter, the specific bit may include a least significant bit of the tire condition data or a bit that is calculated using the least significant bit of the tire condition data.

The least significant bit of the tire condition data and the bit that is calculated using the least significant bit of the tire condition data have values that easily change as compared to the other bits. Accordingly, the specific angles at which the transmission data is transmitted are likely to vary.

To achieve the foregoing objective and in accordance with a third aspect of the present invention, a receiver is provided that is mounted on a vehicle that includes rotation angle detecting sections that detect rotation angles of respective wheel assemblies. The receiver includes a receiving section, an identifying section, and a reception storage section. The receiving section is configured to be capable of receiving transmission data from a transmitter capable of transmitting the transmission data when detecting that a rotation angle of the wheel assembly is a specific angle. Upon reception of the transmission data transmitted at the specific angle, the identifying section identifies one of the wheel assemblies to which the transmitter is attached based on a detection value obtained from the rotation angle detecting section. The reception storage section stores a correspondence relationship in which values of a specific bit among bits of the transmission data that change as the wheel assembly rotates are respectively assigned to the specific angles set for a rotation angle of the wheel assembly. The receiving section receives the transmission data from the transmitter that transmits the transmission data at the specific angle corresponding to the correspondence relationship. The identifying section is configured to acquire the specific angle at which the transmission data has been transmitted based on the correspondence relationship and the specific bit of the transmission data received by the receiving section, and identify one of the wheel assemblies to which the transmitter is attached based on the specific angle.

The reception storage section stores the correspondence relationship between the specific bits and the specific angles. Thus, even if angle information is not contained in the transmission data, the identifying section is able to identify at which of the specific angles the transmission data has been transmitted. That is, the specific angle at which the transmission data has been transmitted can be acquired without containing angle information in the transmission data. Thus, the transmitter does not need to receive transmission data containing angle information. This shortens the data length of the transmission data as compared with a case in which the transmission data contains angle information. This reduces the consumption of power of the power source by transmission of the transmission data.

Effects of the Invention

The present invention reduces the power consumption by transmission of the transmission data.

MODES FOR CARRYING OUT THE INVENTION

A tire condition monitoring system, a transmitter, and a receiver according to an embodiment will now be described.

Figure 1:
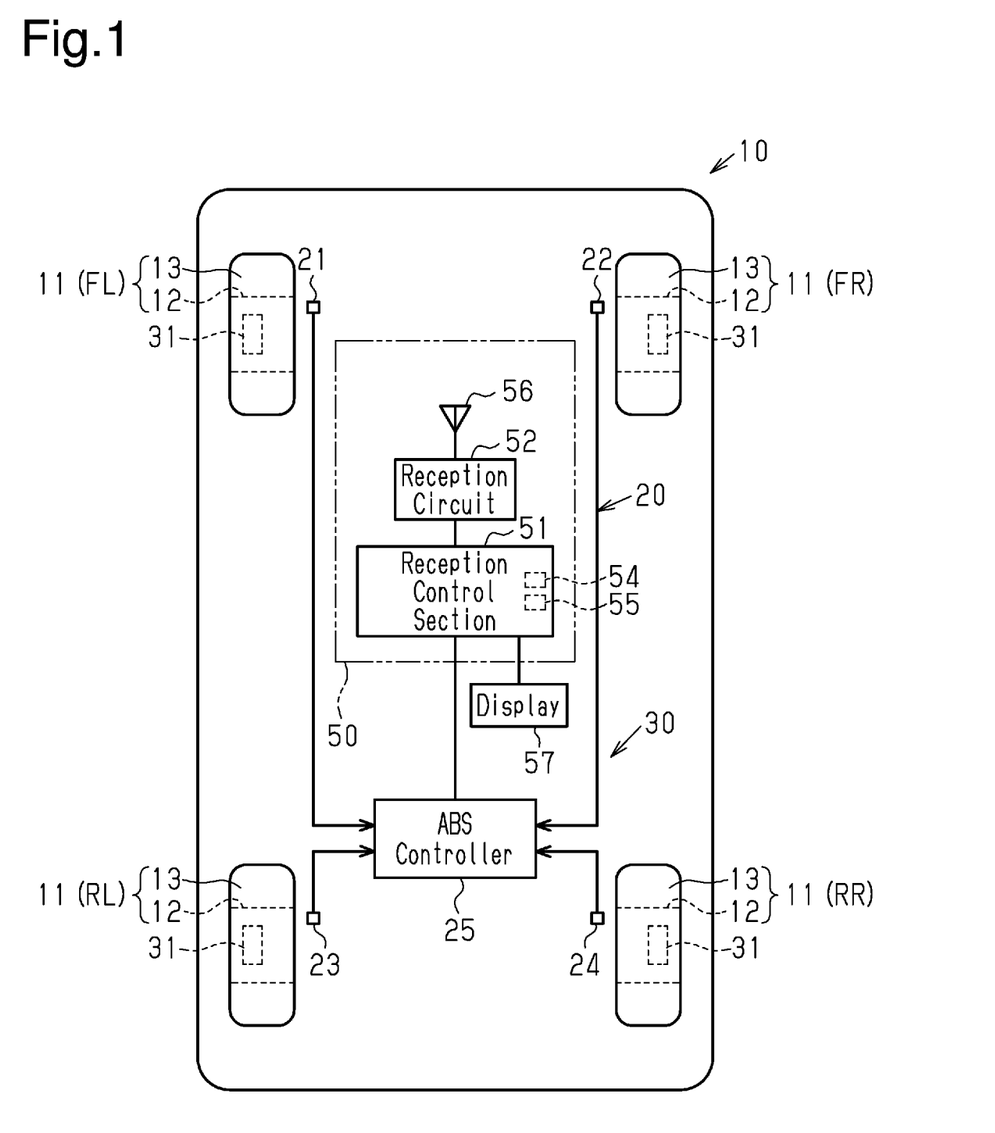
FIG. 1 is a schematic diagram showing the configuration of a tire condition monitoring system.

As shown in FIG. 1, a tire condition monitoring system 30 is mounted on a vehicle 10.

The vehicle 10 includes four wheel assemblies 11. Each of the wheel assemblies 11 includes a wheel 12 and a tire 13 attached to the wheel 12. The wheel assembly 11 on the right front side will be denoted by FR, the wheel assembly 11 on the left front side will be denoted by FL, the wheel assembly 11 on the right rear side will be denoted by RR, and the wheel assembly 11 on the left rear side will be denoted by RL.

The vehicle 10 includes an antilock braking system (ABS) 20. The ABS 20 includes an ABS controller 25 and rotation sensors 21 to 24, which respectively correspond to the four wheel assemblies 11. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 includes a microcomputer and the like and acquires the rotation angle of each of the wheel assemblies 11 based on signals from the rotation sensor units 21 to 24.

Figure 2:
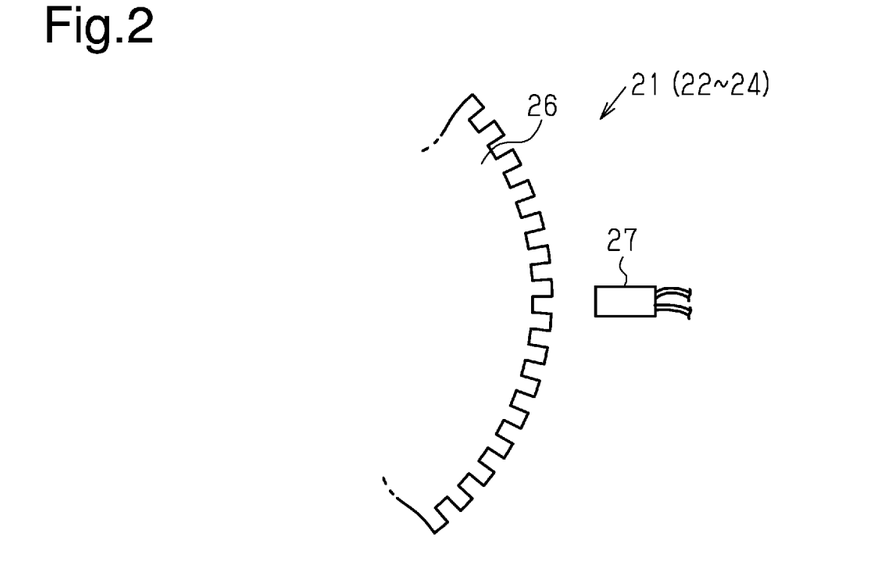
FIG. 2 is a schematic diagram showing the configuration of a rotation sensor unit.

As shown in FIG. 2, each of the rotation sensor units 21 to 24, which serve as a rotation angle detecting section, includes a gear 26, which rotates integrally with the wheel assembly 11, and a detector 27 arranged to face the outer circumferential surface of the gear 26. The gear 26 has teeth arranged on the outer circumferential surface at constant angular intervals. The gear 26 has forty-eight teeth. The detector 27 detects pulses generated when the gear 26 is rotated. The ABS controller 25 is connected to the detector 27 by wire and obtains the rotation angle of each of the wheel assemblies 11 based on a pulse count value, which is a detection value of each of the detectors 27. Specifically, the ABS controller 25 counts rising edges and falling edges of pulses generated in the detector 27. The ABS controller 25 calculates, as the pulse count value, the remainder when the counted number of pulses is divided by the number of pulses per rotation of the gear 26 (ninety-six). Also, the degree of rotation of the gear 26 per pulse count is obtained by dividing 360 degrees by the number of pulses generated in the detector 27 while the wheel assembly 11 rotates one rotation. In this manner, the rotation angle of the wheel assembly 11 is obtained from the pulse count value. The pulse count value is from 0 to 95.

The tire condition monitoring system 30 will now be described.

As shown in FIG. 1, the tire condition monitoring system 30 includes transmitters 31 and a receiver 50. Each transmitter 31 is attached to one of the four wheel assemblies 11. The receiver 50 is installed in the vehicle 10. The transmitter 31 is attached to the wheel assembly 11 so as to be arranged in the inner space of the tire 13. The transmitter 31 is of a type that is fixed to the tire valve, the wheel 12, or the tire 13. The transmitter 31 detects the condition of the corresponding tire 13 and wirelessly transmits transmission data including detected information of the tire 13 to the receiver 50. The tire condition monitoring system 30 monitors the condition of the tire 13 by receiving the transmission data transmitted from the transmitter 31 through the receiver 50.

Figure 3:
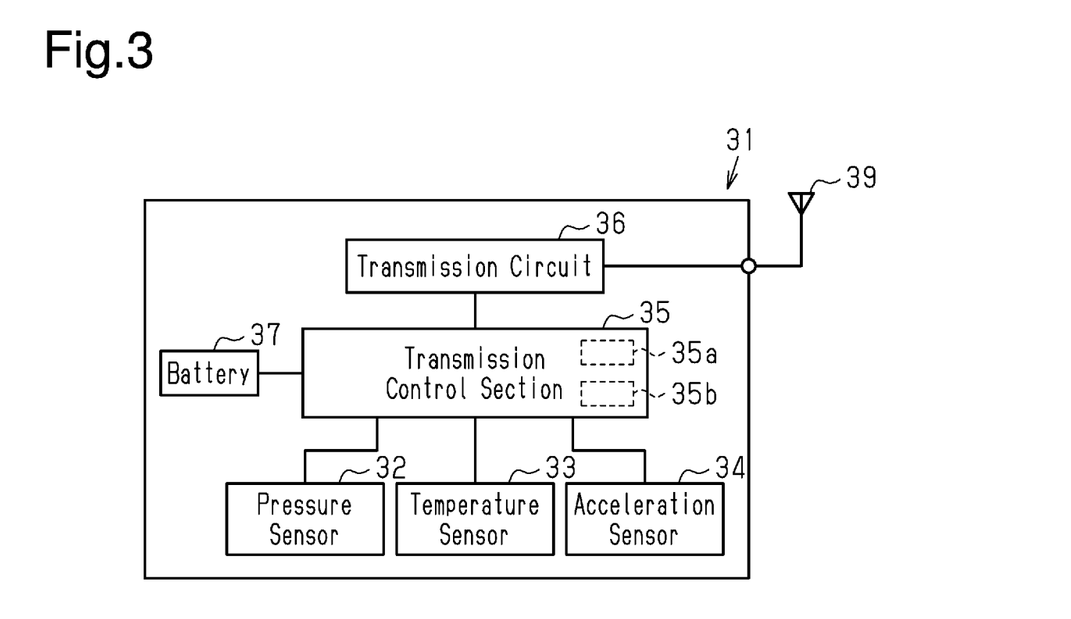
FIG. 3 is a schematic diagram of a transmitter.

As shown in FIG. 3, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37, which is the power source of the transmitter 31, may be a primary battery or a power storage device such as a rechargeable battery or a capacitor.

The pressure sensor 32 detects the air pressure of the corresponding tire 13. The temperature sensor 33 detects the temperature inside the corresponding tire 13.

Figure 4:
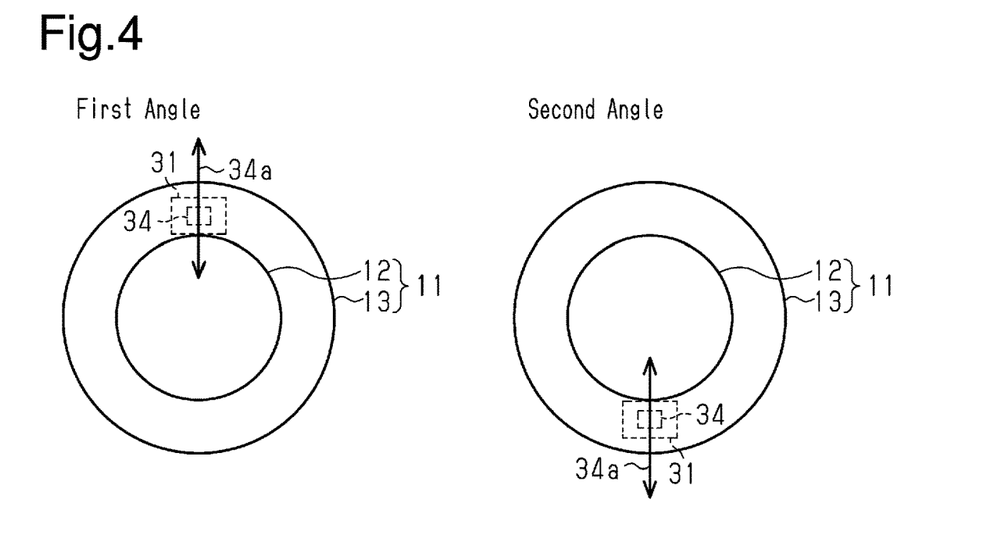
FIG. 4 is a diagram showing the positional relationship between the detection axis of an acceleration sensor and a wheel assembly.

As shown in FIG. 4, the acceleration sensor 34 includes a detection axis 34a so as to detect acceleration in the axial direction of the detection axis 34a. The acceleration sensor 34 is attached to the wheel assembly 11 so as to detect the centrifugal force generated by rotation of the wheel assembly 11. For example, the acceleration sensor 34 is attached to the wheel assembly 11 such that the detection axis 34a is directed in the vertical direction when the transmitter 31 is located at the lowest position of the wheel assembly 11. The acceleration sensor 34 may be a uniaxial acceleration sensor 34 or a multiaxial acceleration sensor 34 as long as it is capable of detecting at least the centrifugal force. The pressure sensor 32, which detects the pressure in the tire 13, and the temperature sensor 33, which detects the temperature in the tire 13, are condition detecting sections.

As shown in FIG. 3, the transmission control section 35 includes a microcomputer or the like including a CPU 35a and a storage section 35b, which includes a RAM, a ROM, and the like. The transmission control section 35 has a timing function. The timing function is implemented by, for example, a timer or a counter. The transmission control section 35 may include dedicated hardware (application specific integrated circuit: ASIC) that executes at least part of various processes. That is, the transmission control section 35 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memories, or computer readable media, include any type of media that are accessible by general-purpose computers and dedicated computers.

The storage section 35b stores an ID code indicating individual identification information of each of the transmitters 31. For illustrative purposes, the ID code of the transmitter 31 attached to the left front wheel assembly FL is denoted by FLID, the ID code of the transmitter 31 attached to the right front wheel assembly FR is denoted by FRID, the ID code of the transmitter 31 attached to the left rear wheel assembly RL is denoted by RLID, and the ID code of the transmitter 31 attached to the right rear wheel assembly RR is denoted by RRID. The storage section 35b stores various programs for controlling the transmitter 31.

The transmission control section 35 generates transmission data and outputs the generated transmission data to the transmission circuit 36. The transmission data is digital data and is a data string of binary numbers. The transmission circuit 36 modulates the transmission data. The modulated transmission data is transmitted from the transmission antenna 39 as a wireless signal. The wireless signal is a signal including the transmission data. The wireless signal is transmitted as a signal of an RF band, for example, a 315 MHz band or a 434 MHz band. The transmission control section 35 functions as a data generating section that generates transmission data. The transmission circuit 36 functions as a transmitting section that transmits the transmission data.

The transmitter 31 is capable of executing normal transmission, by which the transmission data is transmitted regardless of the rotation angle of the wheel assembly 11, and specific angle transmission, by which the transmission data is transmitted when the rotation angle of the wheel assembly 11 is a predetermined specific angle.

In the normal transmission, the transmission data is transmitted from the transmitter 31 at a predetermined interval. The predetermined interval is set to, for example, ten seconds to several tens of seconds.

The specific angle transmission is performed, for example, when the vehicle 10 has been in a stopped state continuously for a predetermined time or longer. The predetermined time is set to time longer than time required for changing the positions of the wheel assemblies 11 such as in tire rotations or time required for replacing the wheel assemblies 11. The predetermined time is set to, for example, several tens of minutes to several hours.

Whether the vehicle 10 is traveling can be determined based on the acceleration detected by the acceleration sensor 34. The centrifugal acceleration acting on the acceleration sensor 34 increases as the vehicle speed increases. If the acceleration detected by the acceleration sensor 34 is greater than or equal to a travel determination threshold, the transmission control section 35 determines that the vehicle 10 is traveling. If the acceleration detected by the acceleration sensor 34 is less than the travel determination threshold, the transmission control section 35 determines that the vehicle 10 is in a stopped state. The travel determination threshold is set to a value greater than the acceleration detected by the acceleration sensor 34 when the vehicle 10 is in a stopped state while taking factors such as tolerances into consideration.

In the specific angle transmission, the transmitter 31 transmits the transmission data when the rotation angle of the wheel assembly 11 is detected to be the predetermined specific angle. Specifically, the transmission control section 35 transmits the transmission data from the transmitter 31 when the specific angle is detected and a predetermined time (for example, ten seconds to several tens of seconds) has elapsed since the last transmission of the transmission data. In the present embodiment, multiple specific angles are set. The set specific angles include a first angle when the transmitter 31 is located at the highest position in the wheel assembly 11 and a second angle when the transmitter 31 is located at the lowest position in the wheel assembly 11. When the first angle is defined as the origin (0°), the second angle is 180°.

Figure 5:
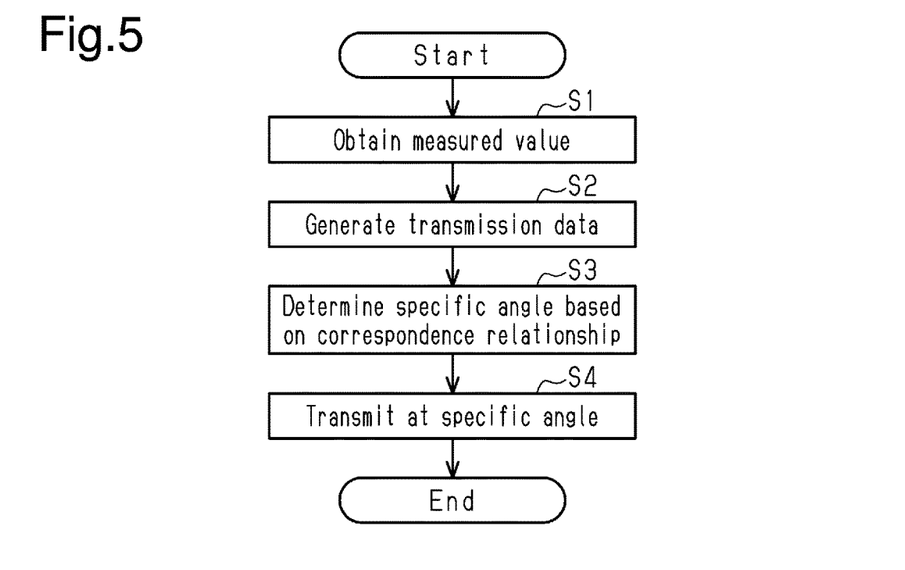
FIG. 5 is a flowchart showing the process performed by a transmission control section when performing a specific angle transmission.

The process executed by the transmission control section 35 when performing specific angle transmission will be described.

As shown in FIG. 5, the transmission control section 35 obtains measured values from the pressure sensor 32 and the temperature sensor 33 in step S1. After obtaining a measured value from the pressure sensor 32 and a measured value of the temperature sensor 33, the transmission control section 35 generates transmission data of a predetermined frame format in step S2.

Figure 6:
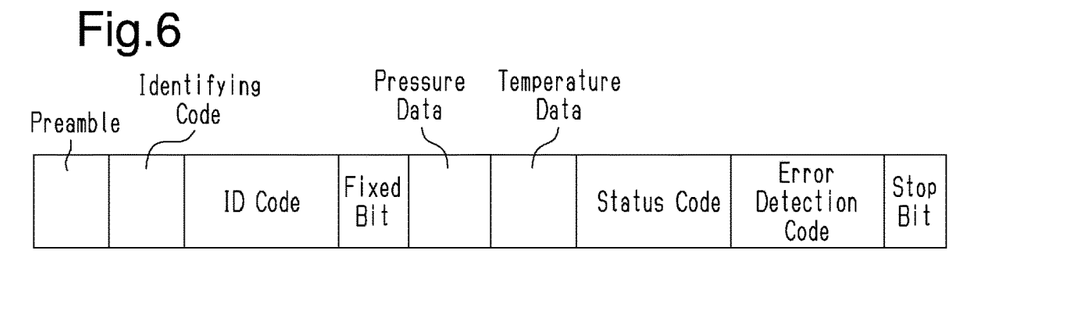
FIG. 6 is a diagram illustrating the frame format of transmission data.

As shown in FIG. 6, the frame formant includes a preamble, an identifying code, an ID code, a fixed bit, pressure data, temperature data, a status code, an error detection code, and a stop bit. The pressure data and the temperature data are tire condition data indicating the condition of the tire 13.

Next, as shown in FIG. 5, the transmission control section 35 determines, in step S3, specific angles, at which the transmission data is transmitted, based on the correspondence relationship between specific bit of the transmission data and the specific angles. The specific bit is a single-digit bit or a multidigit bit selected from bits in the transmission data of which the values change as the wheel assembly 11 rotates.

The bits of which the values change as the wheel assembly 11 rotates include the pressure data, the temperature data, and the error detection code. The pressure data is data indicating the measured value obtained from the pressure sensor 32. The temperature data is data indicating the measured value obtained from the temperature sensor 33. The error detection code may be any error detection code such as a parity bit, a checksum, mirror data, and a CRC code. A checksum is used as the error detection code. The checksum is computed from the ID code, the fixed bit, the pressure data, the temperature data, and the status code. In place of the error detection code, an error correction code such as a BCH code, an RS code, a Hamming code, a turbo code, and a convolutional code may be used.

Figure 7:
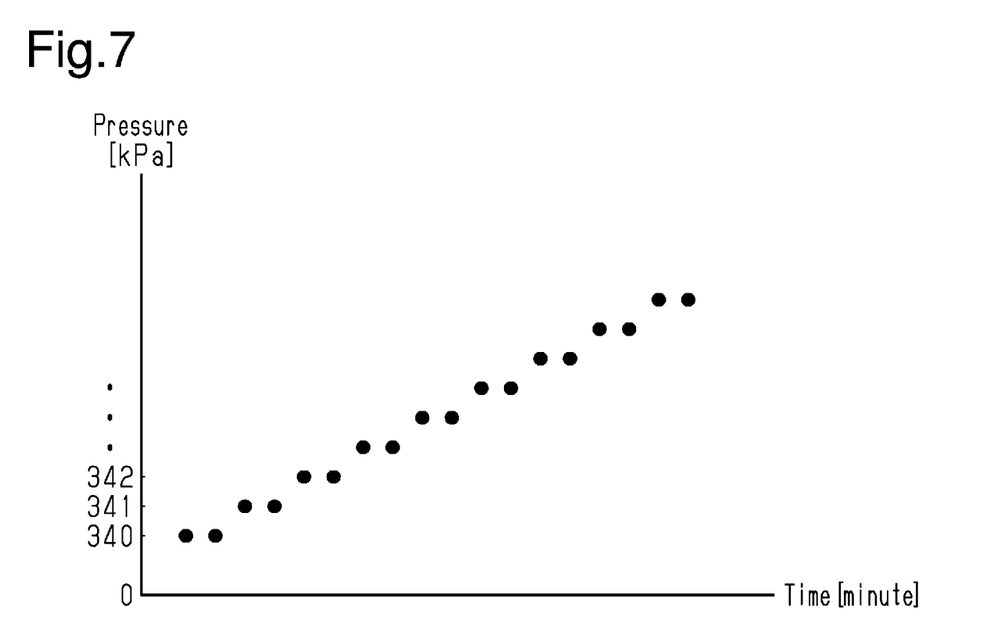
FIG. 7 is a diagram showing the relationship between vehicle speed and the pressure in the tire.

FIG. 7 shows the correspondence relationship between the time for which the vehicle 10 has traveled and the pressure in the tire 13 in a case in which the vehicle 10 starts traveling from a stopped state. As shown in FIG. 7, the pressure in the tire 13 increases as the vehicle 10 travels. This is because the temperature in the tire 13 increases as the vehicle 10 travels, and the pressure in the tire 13 increases, accordingly.

As described above, the values of the pressure data and the temperature data change as the wheel assembly 11 rotates. The error detection code is calculated by using the pressure data and the temperature data. Thus, together with the pressure data and the temperature data, the value of the error detection code changes as the wheel assembly 11 rotates. The error detection code contains a bit that is calculated by using at least one of the least significant bit of the pressure data and the least significant bit of the temperature data. The calculated bit corresponds to a bit that is calculated by using the least significant bit of the tire condition data.

The specific bit may be an arbitrary bit that is selected from a data string indicating the pressure data, the temperature data, and the error detection code. The specific bit preferably includes any of the least significant bit of the pressure data, the least significant bit of the temperature data, and the bit that is calculated by using the least significant bit of the tire condition data in the error detection code. The least significant bit of the pressure data is used as the specific bit. If the resolution is 1 [kPa], the value of the least significant bit of the pressure data changes each time the pressure in the tire 13 changes by 1 [kPa].

Figure 8:
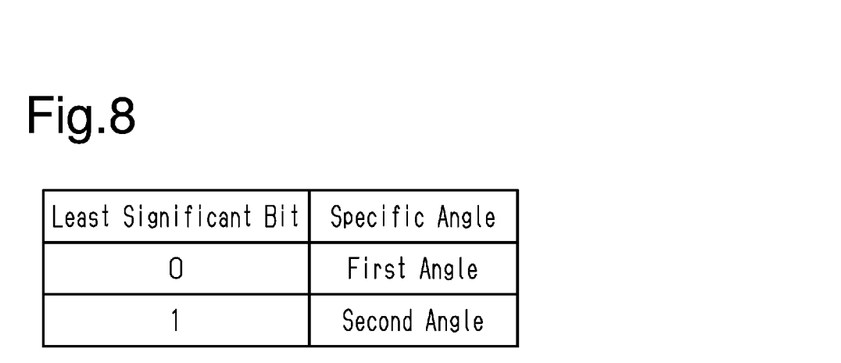
FIG. 8 is a diagram showing a correspondence relationship between the least significant bit of the pressure data and the specific angle.

As shown in FIG. 8, the first angle is assigned to the value 0 of the least significant bit of the pressure data, and the second angle is assigned to the value 1 of the least significant bit of the pressure data. This correspondence relationship is stored in the storage section 35b. The transmission control section 35 acquires the least significant bit of the pressure data from the transmission data generated in step S1. If the least significant data of the pressure data is 0, the transmission control section 35 determines that the specific angle at which the transmission data is transmitted is the first angle. If the least significant data of the pressure data is 1, the transmission control section 35 determines that the specific angle at which the transmission data is transmitted is the second angle.

Next, as shown in FIG. 5, the transmission control section 35 transmits, in step S4, the transmission data upon detection of the specific angle determined in step S3. Whether the transmitter 31 is located at the specific angle can be detected based on the acceleration detected by the acceleration sensor 34. As described above, the axial direction of the detection axis 34a extends is the same as the direction in which the centrifugal force acts regardless of the rotation angle of the wheel assembly 11. Thus, the acceleration sensor 34 detects the centrifugal acceleration regardless of the rotation angle of the wheel assembly 11. On the other hand, the gravitational acceleration always acts in the vertical direction. Thus, in a case in which the detection axis 34a is not directed in the vertical direction, the acceleration sensor 34 detects a component force of the gravitational acceleration. The acceleration sensor 34 thus detects an acceleration obtained by adding the gravitational acceleration to the centrifugal acceleration.

Unless the vehicle 10 is abruptly accelerated or stopped, the centrifugal acceleration changes only slightly in one turn of the wheel assembly 11. Accordingly, the acceleration changed in one turn of the wheel assembly 11 is deemed to be the gravitational acceleration. Thus, the rotation angle of the wheel assembly 11 being the specific angle can be detected by using a change of the gravitational acceleration. When only the gravitational acceleration is considered, the gravitational acceleration changes in one turn of the wheel assembly 11 in a range between +1 [G] and −1 [G]. The gravitational acceleration when the transmitter 31 is located at the lowest position so that the detection axis 34a is oriented in the vertical direction is +1 [G]. Also, the gravitational acceleration when the transmitter 31 is located at the highest position so that the detection axis 34a is oriented in the vertical direction is −1 [G]. By using changes in the gravitational acceleration, the transmission control section 35 is able to transmit the transmission data upon detection of the specific angle.

The "specific angle" is the rotation angle of the wheel assembly 11 including an acceptable range. Errors can occur between the specific angle and the rotation angle of the wheel assembly 11 at which the transmission data is actually transmitted due to various factors such as the frequency at which the transmission control section 35 obtains the acceleration and detection errors of the acceleration sensor 34. Thus, the "specific angle" does not only indicate an angle exactly matching the specific angle but includes an acceptable range with errors taken into consideration.

Through the above-described process, the transmission data is transmitted at the specific angles, which correspond to the least significant bit of the pressure data. The least significant bit of the pressure data changes as the vehicle 10 travels. Therefore, the transmission data is transmitted at both of the first angle and the second angle in response to traveling of the vehicle 10.

The receiver 50 will now be described.

As shown in FIG. 1, the receiver 50 includes a reception control section 51, a reception circuit 52, and a reception antenna 56. The reception control section 51 is connected to a display 57 mounted on the vehicle 10. The reception control section 51 includes a microcomputer or the like including a reception CPU 54 and a reception storage section 55 (a ROM, a RAM and the like). The reception control section 51 includes a timing function. The timing function is implemented by, for example, a timer or a counter. The reception control section 51 may include dedicated hardware (application specific integrated circuit: ASIC) that executes at least part of various processes. That is, the reception control section 51 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memories, or computer readable media, include any type of media that are accessible by general-purpose computers and dedicated computers.

The reception circuit 52 demodulates wireless signals received from each of the transmitters 31 via the reception antenna 56 and outputs the transmission data from the transmitters 31 to the reception control section 51. The reception circuit 52 functions as a receiving section.

The reception control section 51 acquires the pressure in the tire 13 and the temperature in the tire 13, which represent the condition of the tire 13, based on the transmission data from the reception circuit 52. When there is an anomaly in the tire 13, the reception control section 51 displays warning on the display 57.

The reception storage section 55 stores the ID codes of the transmitters 31 mounted on the four wheel assemblies 11. With this, the transmitters 31 are associated with the receiver 50.

In some cases, it is desired to determine which one of the four wheel assemblies 11 includes the tire 13 to which the received transmission data corresponds. For example, in some cases, it is desired to display on the display 57 the wheel assembly 11 in which pressure anomaly has occurred in the tire 13. In other cases, it is desired to display on the display 57 the pressures of the tires 13 of the respective wheel assemblies 11. In such cases, it is required to determine the wheel assembly 11 to which the received transmission data corresponds. In other words, the reception control section 51 needs to associate the ID codes of the respective transmitters 31 with the positions of the wheel assemblies 11.

Figure 9:
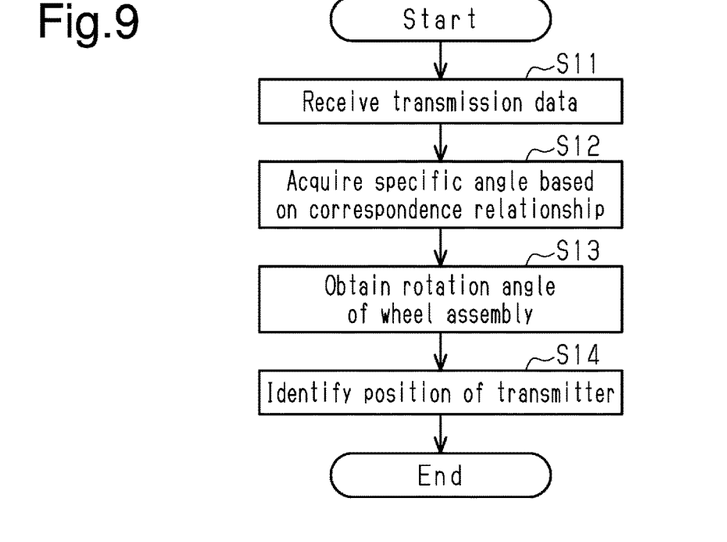
FIG. 9 is a flowchart showing a wheel assembly position identifying process executed by the reception control section.

A wheel assembly position identifying process for identifying one of the four wheel assemblies 11 to which each transmitter 31 is attached will now be described. The wheel assembly position identifying process is performed when the vehicle 10 is activated by a start switch, which switches the state of the vehicle 10 between the activated state and the stopped state. The activated state of the vehicle 10 refers to a state in which the vehicle 10 can travel through operation of the accelerator pedal. The stopped state of the vehicle 10 refers to a state in which the vehicle 10 will not travel even if the accelerator pedal is operated.

As shown in FIG. 9, the reception control section 51 receives transmission data in step S11. Next, in step S12, the reception control section 51 acquires the specific angle at which the received transmission data has been transmitted based on the correspondence relationship between the least significant bit of the pressure data and the specific angle. The reception storage section 55 stores the same correspondence relationship as that stored in the storage section 35b of the transmitter 31. That is, the reception storage section 55 stores the correspondence relationship between the specific bit and the specific angles. As described above, the first angle is assigned to the value 0 of the least significant bit of the pressure data, and the second angle is assigned to the value 1 of the least significant bit of the pressure data. The reception control section 51 acquires the specific angle at which the transmission data has been transmitted based on the least significant bit of the pressure data.

Next, in step S13, the reception control section 51 obtains the pulse count value of each of the rotation sensor units 21 to 24 upon reception of the transmission data. The processes of step S12 and S13 may be executed either in order of step S12 and step 13 or in order of step S13 and step S12. Also, the process of step S12 and the process of step S13 may be executed simultaneously.

Next, in step S14, the reception control section 51 performs position identification to identify one of the four wheel assemblies 11 to which each of the transmitters 31 is attached. The position identification is performed by obtaining and collecting pulse count values upon reception of the transmission data each time the transmission data is received. The rotation speeds of the wheel assemblies 11 differ, for example, due to the influence of the differential gear. Thus, the relative positions of the transmitters 31 attached to the wheel assemblies 11 change in accordance with travelling of the vehicle 10. Thus, in a case in which the transmitters 31 transmit the transmission data at the specific angle, the rotation angles of the four wheel assemblies 11 is synchronized with the rotation angle at which the transmission data from one of the four transmitters 31 is transmitted. Thus, in a case in which the transmitters 31 transmit the transmission data at the specific angles, when the pulse count value is obtained upon reception of the transmission data, the rotation sensor units 21 to 24 include a rotational sensor unit that has a small variation of the pulse count value in correspondence with each transmitter 31. It is thus possible to identify one of the four wheel assemblies 11 to which each of the transmitters 31 is attached based on the variation of the pulse count value collected each time the transmission data is obtained.

When the transmission data is transmitted at multiple specific angles, the pulse count values obtained from the rotation sensor units 21 to 24 differ from each other depending on at which of two specific angles the transmission data has been transmitted. The reception control section 51 thus needs to identify the position of the transmitter 31 after acquiring the specific angle at which the transmission data has been transmitted.

There are various types of control for performing the position identification of the transmitter 31. For example, the pulse count value that is obtained upon reception of the transmission data transmitted at the first angle and the pulse count value that is obtained upon reception of the transmission data transmitted at the second angle may be collected separately. Also, forty-eight may be added to or subtracted from the pulse count value that is obtained upon reception of the transmission data transmitted at the first angle or the pulse count value that is obtained upon reception of the transmission data transmitted at the second angle. In this case, addition or subtraction of the pulse count value (forty-eight) that corresponds to the difference between the first angle and the second angle allows for identification of the position of the transmitter 31 by assuming that the transmission data is transmitted at a single specific angle. In this case, if the receiver 50 receives all the transmission data, the pulse count values are collected with twice the speed of a case in which the pulse count values are independently collected at the first angle and the second angle. This shortens the time required to identify the position of the transmitter 31.

Figure 10:
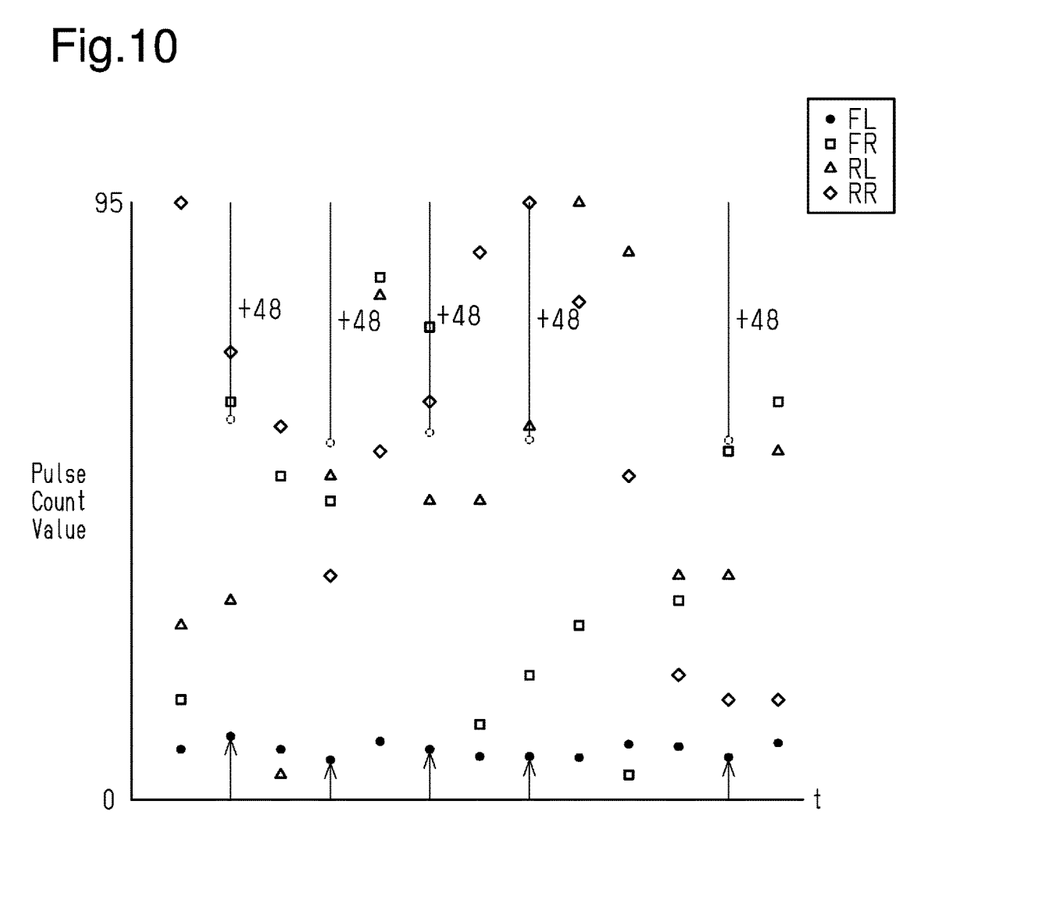
FIG. 10 is a diagram showing an example of the pulse count values obtained upon reception of transmission data transmitted from the transmitter mounted on the left front wheel assembly.

It is now assumed that, as shown in FIG. 10, the transmitter 31 attached to the left front wheel assembly FL has transmitted the transmission data multiple times at the first angle and the second angle. The reception control section 51 collects the pulse count value that is obtained upon reception of the transmission data transmitted at the first angle and the value obtained by adding forty-eight to the pulse count value that is obtained upon reception of the transmission data transmitted at the second angle.

In the example of FIG. 10, the variation of the pulse count value detected by the first rotation sensor unit 21 corresponding to the left front wheel assembly FL is the smallest. Therefore, the transmitter 31 of the FLID is identified as that attached to the left front wheel assembly FL. Also, the reception control section 51 functions as an identifying section that identifies one of the four wheel assemblies 11 to which each transmitter 31 is attached. Thus, the reception control section 51 identifies the wheel assemblies 11 to which the transmitters 31 of the FFID, RLID, and RRID are respectively attached.

By executing the process of step S14, the reception control section 51 identifies one of the four wheel assemblies 11 to which each transmitter 31 is attached. The reception control section 51 stores the four ID codes and the positions of the respective wheel assemblies 11 in the reception storage section 55 while associating the ID codes and the positions with each other. The processes of the steps S11 to S14 are repeated each time the transmission data is received until the correspondence relationship between all the transmitters 31 and the wheel assemblies 11 are identified. When the four ID codes are associated with the positions of the wheel assemblies 11 through the process of step S14, the reception control section 51 ends the wheel assembly position identifying process.

Next, an operation of transmitters 31, the receiver 50, and the tire condition monitoring system 30 will be described.

The transmitters 31 transmit transmission data at the first angle and the second angle in correspondence with the value of the specific bit of the transmission data. Based on the specific bit of the transmission data, the reception control section 51 determines whether the specific angle at which the transmission data has been transmitted is the first angle or the second angle, thereby identifying the position of the transmitter 31. Since the transmission data is transmitted at multiple specific angles, the influence of the null points is avoided.

In order to allowing the receiver 50 to identify the position of the transmitter 31 while avoiding the influence of the null points, the transmission data may be transmitted alternately at the first angle and the second angle. If the receiver 50 can recognize that the transmission data is alternately transmitted at the first angle and the second angle, the receiver 50 can collect the pulse count values for the transmission data transmitted at the first angle and the transmission data transmitted at the second angle. Further, in some cases, the transmission data cannot be received due to the communication environment or the like, and therefore transmission data transmitted at the first angle (or the second angle) is received successively. In this case also, since the interval of transmission of the transmission data is known, it is possible to recognize that the transmission data transmitted at the same specific angle is received two consecutive times in a case in which the reception interval of the transmission data is approximately twice the transmission interval of the transmission data.

However, in a case in which the transmission data cannot be received for several consecutive times, it is difficult to identify one of the four wheel assemblies 11 to which each of the transmitters 31 is attached. This is because it is impossible to determine whether the received transmission data has been transmitted at the first angle or the second angle after the transmission data has been unable to be received for several consecutive times due to the accuracy of the timing function of the reception control section 51 or the like.

However, in the present embodiment, the specific angles are assigned to the values of the least significant bit of the pressure data, and the correspondence relationship between the least significant bit of the pressure data and the specific angles is stored both in the storage section 35b of the transmitter 31 and the reception storage section 55 of the receiver 50. Therefore, even if the reception control section 51 cannot receive the transmission data for several consecutive times, the reception control section 51 is able to determine whether the transmission data has been transmitted at the first angle or the second angle based on the least significant bit of the pressure data.

The present embodiment has the following advantages.

(1) The transmission control section 35 causes the transmitter 31 to transmit the transmission data at the specific angles that correspond to the least significant bit of the pressure data. The reception control section 51 determines that the transmission data has been transmitted at the specific angle that corresponds to the least significant bit of the pressure data. Thus, the reception control section 51 is able to acquire the specific angle at which the transmission data has been transmitted even if the transmission data does not contain data indicating the angle information. This shortens the data length of the transmission data as compared with the case in which the transmission data contains data indicating only the angle information. This reduces the consumption of the power of the battery 37 by transmission of the transmission data, thereby extending the life of the battery 37.

(2) The least significant bit of the pressure data is selected as the specific bit. As compared with bits other than the least significant bit, the value of the least significant bit of the pressure data fluctuates due to slight changes in the pressure value. Accordingly, the specific angles at which the transmission data is transmitted are likely to vary.

(3) In some cases, a specific angle transmitting feature is added to the transmitter 31 that cannot transmit the transmission data at the specific angles, in other words, to the transmitter 31 of which the position cannot be identified by the receiver 50. In this case, if the angle information is contained in the transmission data in order for the receiver 50 to acquire the specific angles, the frame format must be changed. In contrast, in a case in which the transmission data is transmitted at specific angles that correspond to a specific bit, the receiver 50 is allowed to acquire the specific angle at which the transmission data has been transmitted by storing the correspondence relationship between the specific bit and the specific angles both in the storage section 35b of the transmitter 31 and the receiver 50. This allows the specific angle transmitting feature to be added to the transmitter 31 without changing the frame formant.

(4) The reception control section 51 acquires the specific angle at which the transmission data has been transmitted based on the correspondence relationship between the specific bit and the specific angles. Even if the angle information is not contained in the transmission data, the reception control section 51 is able to identify at which of the specific angles the transmission data has been transmitted. That is, the specific angle at which the transmission data has been transmitted can be acquired without containing data indicating angle information in the transmission data. Thus, the transmitter 31 does not need to transmit transmission data containing angle information. This reduces the consumption of the power of the battery 37 by transmission of the transmission data, thereby extending the life of the battery 37.

(5) The tire condition monitoring system 30 includes the transmitters 31 and the receiver 50. The transmitter 31 transmits the transmission data at the specific angles that correspond to the specific bit, and the receiver 50 acquires the fact that the transmission data has been transmitted at the specific angle that corresponds to the specific bit. The transmission data does not need to contain angle information. This reduces the consumption of the power of the battery 37 by transmission of the transmission data, thereby extending the life of the battery 37.

The present embodiment may be modified as follows. The present embodiment and the following modifications can be combined as long as the combined modifications remain technically consistent with each other.

The specific bit may be changed as long as it includes the least significant bit of the pressure data. For example, the least significant bit and the bit that is one-bit higher than the least significant bit may be used as a set of two specific bits. In this case, for example, 00 is assigned to the first angle, 01 is assigned to the second angle, 10 is assigned to the third angle, and the 11 is assigned to the fourth angle. The third angle is a specific angle different from the first angle and the second angle, and is, for example, 90°. The fourth angle is a specific angle different from the first angle, the second angle, and the third angle, and is, for example, 270°.

A bit different from the least significant bit of the pressure data may be used as the specific bit. For example, a bit that is one-bit higher than the least significant bit or a bit that is two-bits higher than the least significant bit may be used as the specific bit. The bit that can be used as the specific bit varies depending on the resolution. If the resolution is low, the value of a higher-order bit is easily changed. If the resolution is high, the value of a higher-order bit is less likely to be changed. Thus, for lower resolutions, even a higher-order bit can be used as the specific bit.

The specific bit may be a bit of either the temperature data or the error detection code.

The value of the specific bit may be a value that is calculated using the specific bit. That is, the value calculated using the specific bit may be associated with multiple corresponding angles. For example, the first angle may be associated with 0, which is the exclusive OR of the least significant bit of the pressure data, which is the specific bit, and the least significant bit of the temperature data, and the second angle may be associated with 1. After generating the transmission data, the transmission control section 35 transmits the transmission data upon detection of the specific angle that corresponds to the value calculated using the specific bit. The reception control section 51 acquires the specific angle at which the transmission data has been transmitted by performing calculation using the specific bit of the received transmission data.

The transmission data simply needs to contain either the pressure data or the temperature data. That is, only a single piece of tire condition data needs to be contained in the transmission data. In this case, the transmitter 31 simply needs to include either the pressure sensor 32 or the temperature sensor 33 as the condition detecting section.

The transmission data may contain acceleration data as the tire condition data. In this case, any of the bits of the acceleration data may be used as the specific bit.

Various types of power generating elements may be used as the power source of the transmitter 31. Even if a member that is capable of being charged or generating power is used as the power source, there is a limit to power that can be used. Therefore, it is preferable to reduce the power consumption by transmission of the transmission data. Thus, by transmitting the transmission data without data indicating the angle information, the limited power is used effectively.

In each embodiment, the vehicle 10 only has to include multiple wheel assemblies 11, and for example, the vehicle 10 may be a motorcycle.

DESCRIPTION OF THE REFERENCE NUMERALS

10 . . . Vehicle; 11 . . . Wheel Assembly; 13 . . . Tire; 21, 22, 23, 24 . . . Rotation Sensor Unit (Rotation Angle Detecting Section); 30 . . . Tire Condition Monitoring System; 31 . . . Transmitter; 32 . . . Pressure Sensor (Condition Detecting Section); 33 . . . Temperature Sensor (Condition Detecting Section); 34 . . . Acceleration Sensor; 35 . . . Transmission Control Section (Data Generating Section); 35b . . . Storage Section; 36 . . . Transmission Circuit (Transmitting Section); 37 . . . Battery (Power Source); 50 . . . Receiver; 51 . . . Reception Control Section (Identifying Section); 52 . . . Reception Circuit (Receiving Section); 55 . . . Reception Storage Section.

The invention claimed is:

1. A tire condition monitoring system comprising transmitters each of which is attached to one of a plurality of wheel assemblies of a vehicle and a receiver mounted on the vehicle, wherein
the vehicle includes rotation angle detecting sections that detect rotation angles of the respective wheel assemblies,
each transmitter includes
a power source of the transmitter,
a condition detecting section configured to detect a condition of a tire,
a data generating section configured to generate transmission data that contains tire condition data indicating the condition of the tire detected by the condition detecting section, the tire condition data including at least one of tire pressure data or tire temperature data,
a transmitting section configured to modulate the transmission data, which is generated by the data generating section, and transmit the modulated data,
a storage section storing a correspondence relationship in which values of a specific bit among bits of the transmission data that change as the wheel assembly rotates are respectively assigned to specific angles set for a rotation angle of the wheel assembly, the specific bit including a least significant bit of the tire condition data or a bit that is calculated using the least significant bit of the tire condition data, and
a transmission control section capable of performing specific angle transmission in which the transmission control section transmits the transmission data from the transmitting section when detecting that the rotation angle of the wheel assembly is any of the specific angles,
the transmission control section is configured to transmit the transmission data at the specific angles that correspond to the specific bit of the transmission data,
the receiver includes
a receiving section configured to be capable of receiving the transmission data from the transmitters,
an identifying section that, upon reception of the transmission data transmitted at the specific angle, identifies one of the wheel assemblies to which the transmitter is attached based on a detection value obtained from the rotation angle detecting section, and
a reception storage section that stores the correspondence relationship,
the receiving section receives the transmission data from the transmitter that transmits the transmission data at the specific angle corresponding to the correspondence relationship, and
the identifying section is configured to
acquire the specific angle at which the transmission data has been transmitted based on the correspondence relationship and the specific bit of the transmission data received by the receiving section, and
identify one of the wheel assemblies to which the transmitter is attached based on the specific angle.

2. A transmitter attached to each of a plurality of wheel assemblies of a vehicle, the vehicle including rotation angle detecting sections that detect rotation angles of the respective wheel assemblies, the transmitter comprising:
a power source of the transmitter;
a condition detecting section configured to detect a condition of a tire;
a data generating section configured to generate transmission data that contains tire condition data indicating the condition of the tire detected by the condition detecting section, the tire condition data including at least one of tire pressure data or tire temperature data;
a transmitting section configured to modulate the transmission data, which is generated by the data generating section, and transmit the modulated data;
a storage section storing a correspondence relationship in which values of a specific bit among bits of the transmission data that change as the wheel assembly rotates are respectively assigned to specific angles set for a rotation angle of the wheel assembly, the specific bit including a least significant bit of the tire condition data or a bit that is calculated using the least significant bit of the tire condition data; and
a transmission control section capable of performing specific angle transmission in which the transmission control section transmits, to a receiver, the transmission data from the transmitting section when detecting that the rotation angle of the wheel assembly is any of the specific angles, wherein
the receiver includes
a reception storage section that stores the correspondence relationship, and
an identifying section that, upon reception of the transmission data, identifies a position of the wheel assembly to which the transmitter is attached based on a detection value obtained from the rotation angle detecting section, and
the transmission control section is configured to transmit the transmission data when detecting that the rotation angle of the wheel assembly is the specific angle that corresponds to the specific bit of the transmission data.

3. A receiver mounted on a vehicle that includes rotation angle detecting sections that detect rotation angles of respective wheel assemblies, the receiver comprising:
a receiving section configured to be capable of receiving transmission data from a transmitter capable of transmitting the transmission data when detecting that a rotation angle of the wheel assembly is a specific angle, the transmission data containing tire condition data that includes at least one of tire pressure data or tire temperature data;

an identifying section that, upon reception of the transmission data transmitted at the specific angle, identifies one of the wheel assemblies to which the transmitter is attached based on a detection value obtained from the rotation angle detecting section; and a reception storage section storing a correspondence relationship in which values of a specific bit among bits of the transmission data that change as the wheel assembly rotates are respectively assigned to the specific angles set for a rotation angle of the wheel assembly, the specific bit including a least significant bit of the tire condition data or a bit that is calculated using the least significant bit of the tire condition data, wherein the receiving section receives the transmission data from the transmitter that transmits the transmission data at the specific angle corresponding to the correspondence relationship, and the identifying section is configured to acquire the specific angle at which the transmission data has been transmitted based on the correspondence relationship and the specific bit of the transmission data received by the receiving section, and identify one of the wheel assemblies to which the transmitter is attached based on the specific angle.

\* \* \* \* \*